(12) United States Patent
Kurtti et al.

(10) Patent No.: US 8,682,576 B2
(45) Date of Patent: Mar. 25, 2014

(54) NAVIGATION BASED ON USER-DEFINED POINTS AND PATHS

(75) Inventors: Jeffrey Wayne Kurtti, Prosper, TX (US); Donald H. Relyea, Jr., Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 974 days.

(21) Appl. No.: 12/327,924

(22) Filed: Dec. 4, 2008

(65) Prior Publication Data

US 2010/0145601 A1  Jun. 10, 2010

(51) Int. Cl.
*G01C 21/34* (2006.01)
(52) U.S. Cl.
USPC ........................................ 701/426
(58) Field of Classification Search
USPC .......................... 701/200–300, 426
See application file for complete search history.

(56) References Cited

U.S. PATENT DOCUMENTS

| | | | |
|---|---|---|---|
| 5,559,707 A * | 9/1996 | DeLorme et al. | 701/467 |
| 7,835,859 B2 * | 11/2010 | Bill | 701/424 |
| 7,953,552 B2 * | 5/2011 | Severson | 701/209 |
| 8,423,291 B2 * | 4/2013 | Geelen | 701/426 |
| 2003/0182052 A1 * | 9/2003 | DeLorme et al. | 701/201 |
| 2004/0215390 A1 * | 10/2004 | Nomura | 701/209 |
| 2006/0167621 A1 * | 7/2006 | Dale | 701/202 |
| 2006/0229807 A1 * | 10/2006 | Sheha et al. | 701/209 |
| 2006/0253247 A1 * | 11/2006 | de Silva et al. | 701/201 |
| 2007/0106468 A1 * | 5/2007 | Eichenbaum et al. | 701/211 |
| 2009/0012955 A1 * | 1/2009 | Chu et al. | 707/5 |
| 2009/0100018 A1 * | 4/2009 | Roberts | 707/3 |
| 2009/0177386 A1 * | 7/2009 | Haase | 701/209 |
| 2009/0182498 A1 * | 7/2009 | Seymour | 701/201 |
| 2009/0271105 A1 * | 10/2009 | Kindo et al. | 701/201 |
| 2009/0276154 A1 * | 11/2009 | Subramanian et al. | 701/213 |
| 2010/0063721 A1 * | 3/2010 | Won | 701/201 |
| 2010/0125406 A1 * | 5/2010 | Prehofer | 701/201 |
| 2010/0125411 A1 * | 5/2010 | Goel | 701/209 |
| 2010/0161221 A1 * | 6/2010 | Jung | 701/209 |
| 2011/0125398 A1 * | 5/2011 | Bos | 701/204 |

* cited by examiner

*Primary Examiner* — Robert Morgan
*Assistant Examiner* — Robert Sorey

(57) ABSTRACT

A device receives, from a user device, a user-defined starting point associated with a path to be navigated by a user associated with the user device, a user-defined destination point associated with the path, and one or more user-defined intermediate points provided between the user-defined starting point and the user-defined destination point. The device also creates a user-defined path based on the user-defined starting point, the user-defined destination point, and the one or more user-defined intermediate points, and provides the user-defined path to the user device.

25 Claims, 15 Drawing Sheets

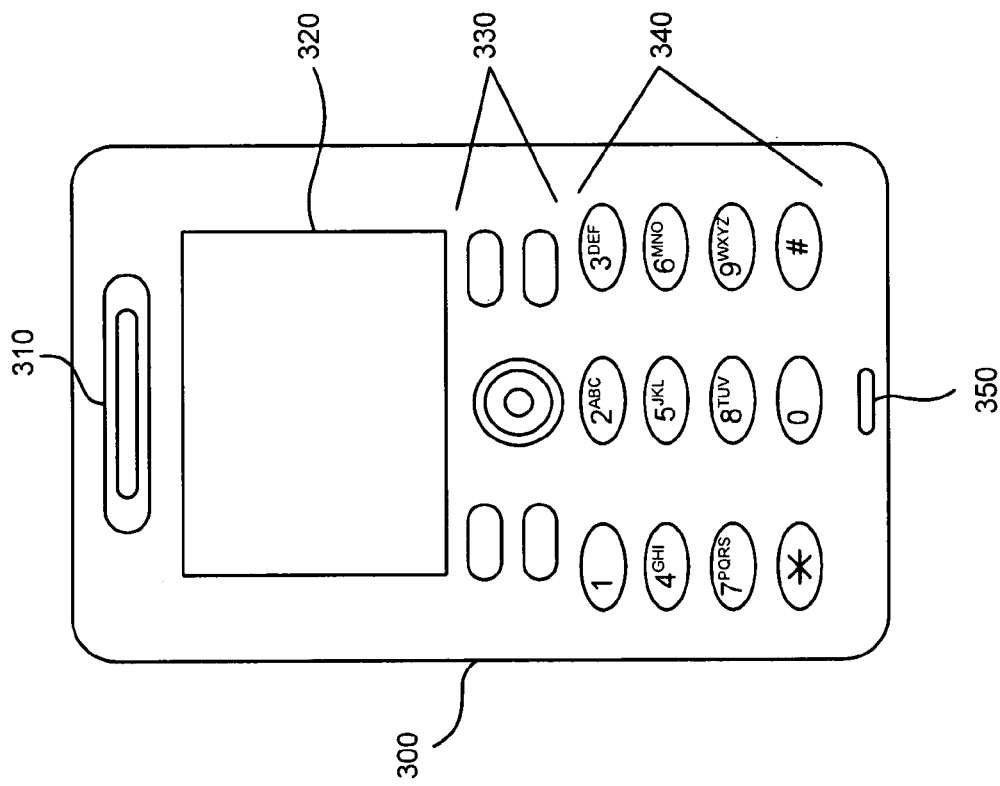

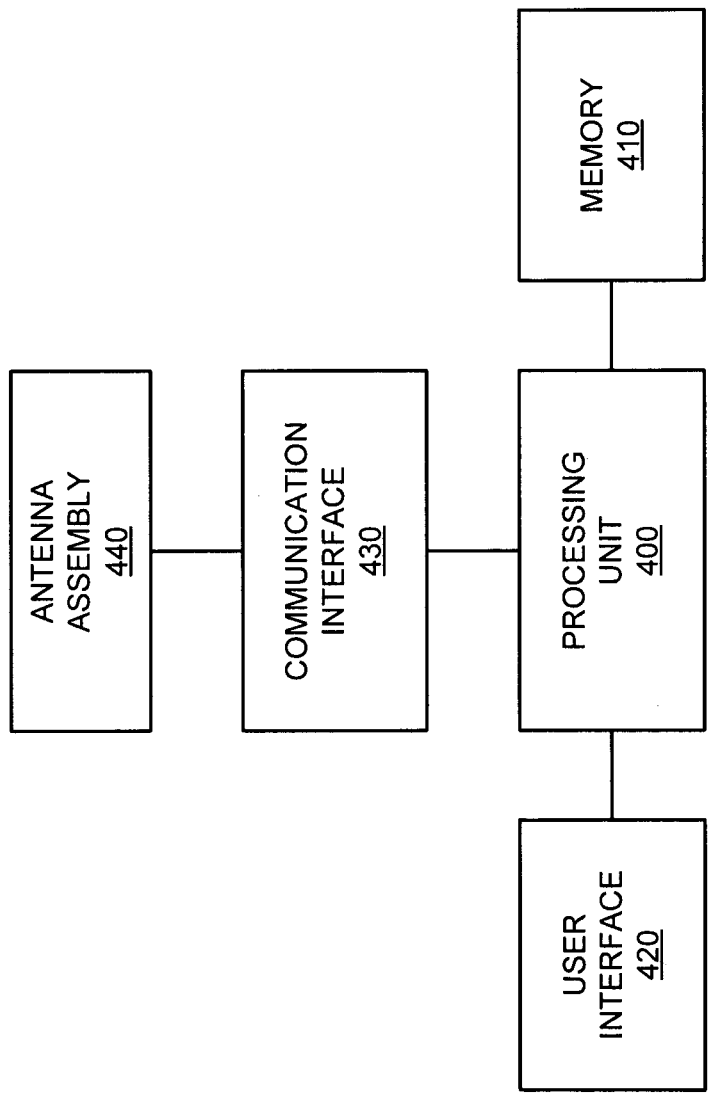

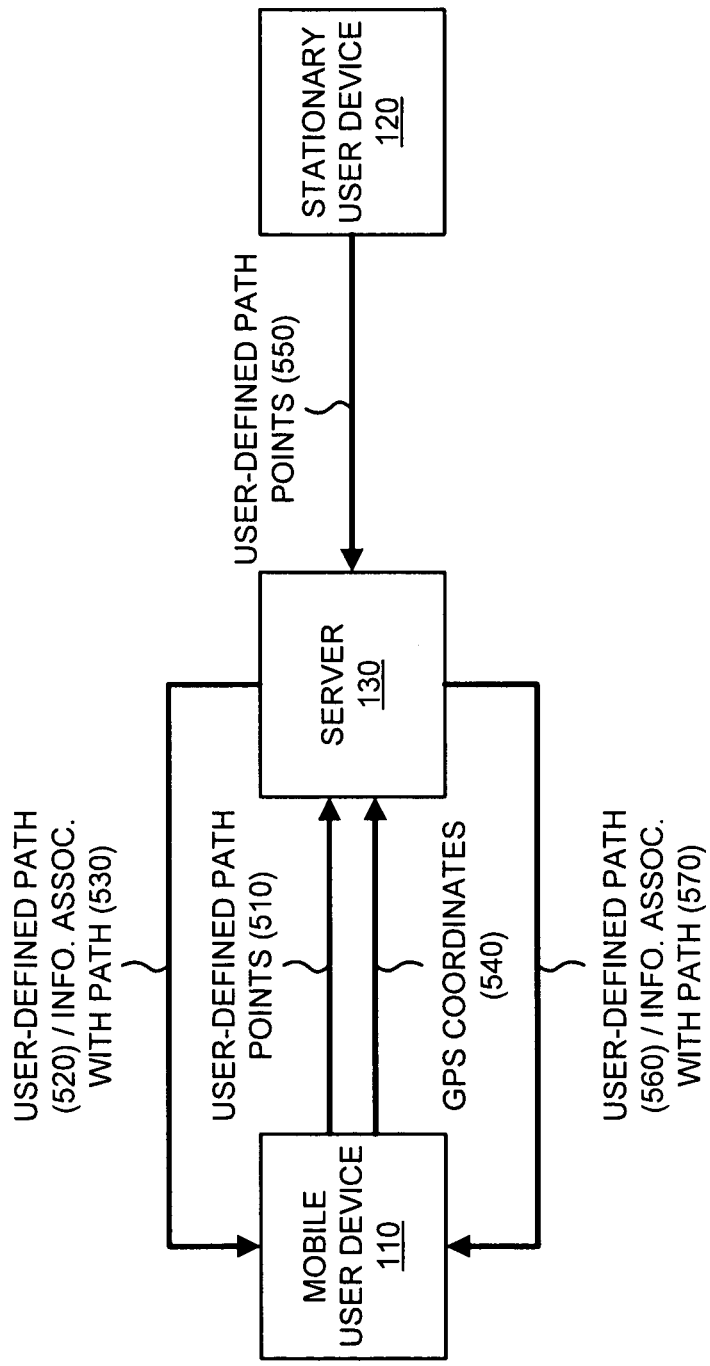

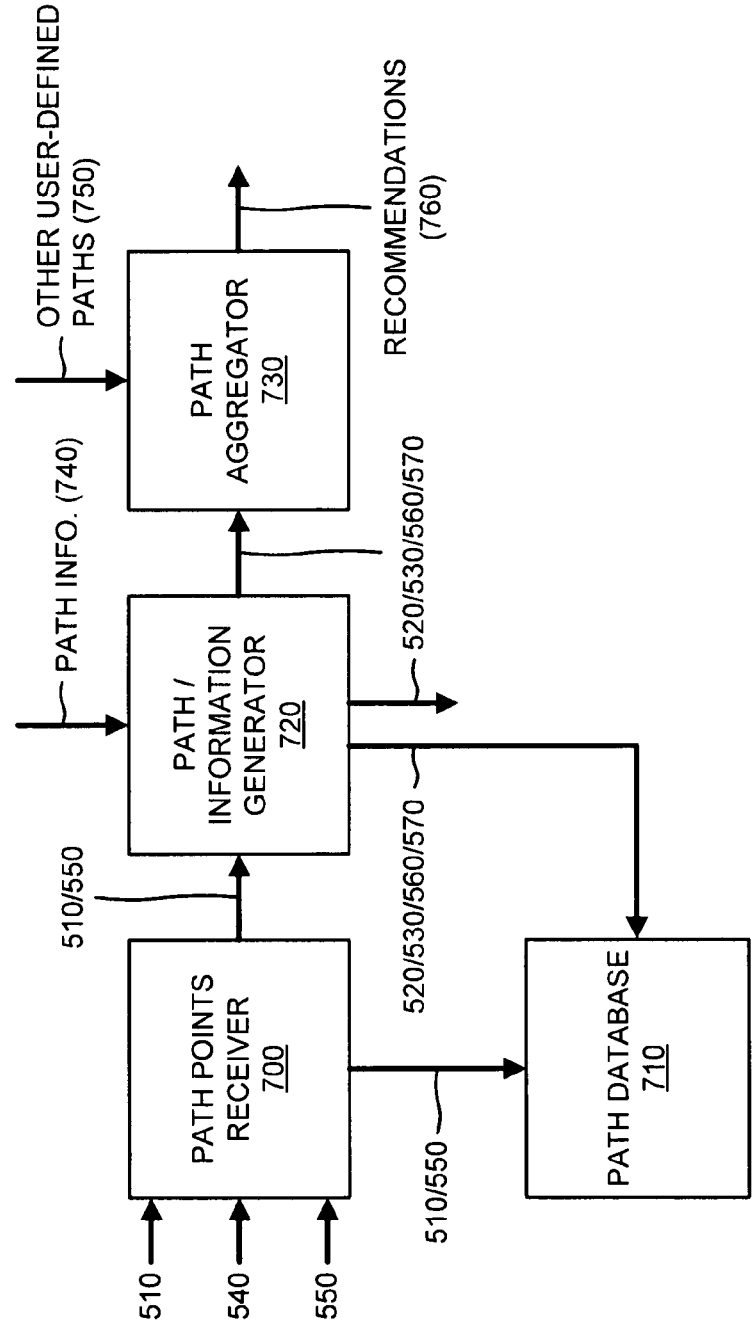

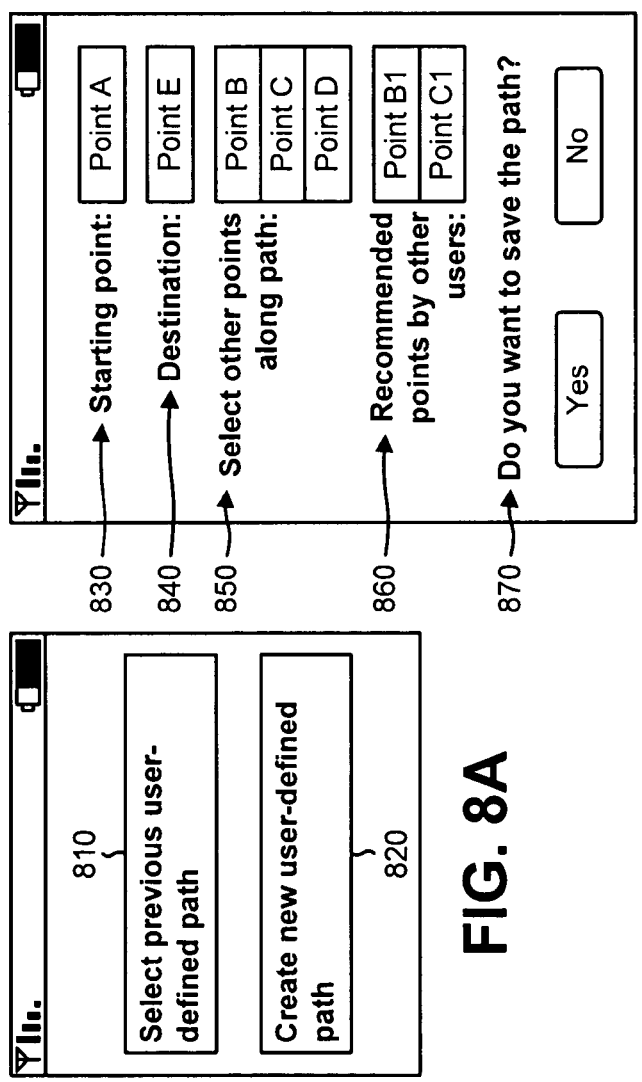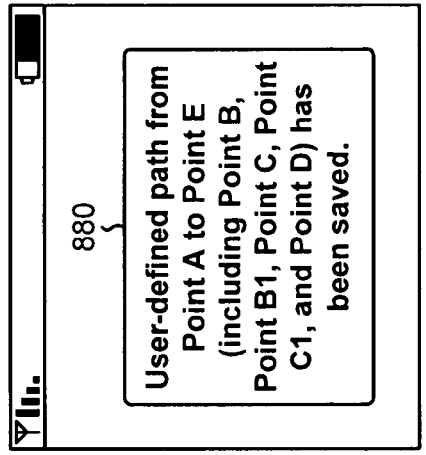

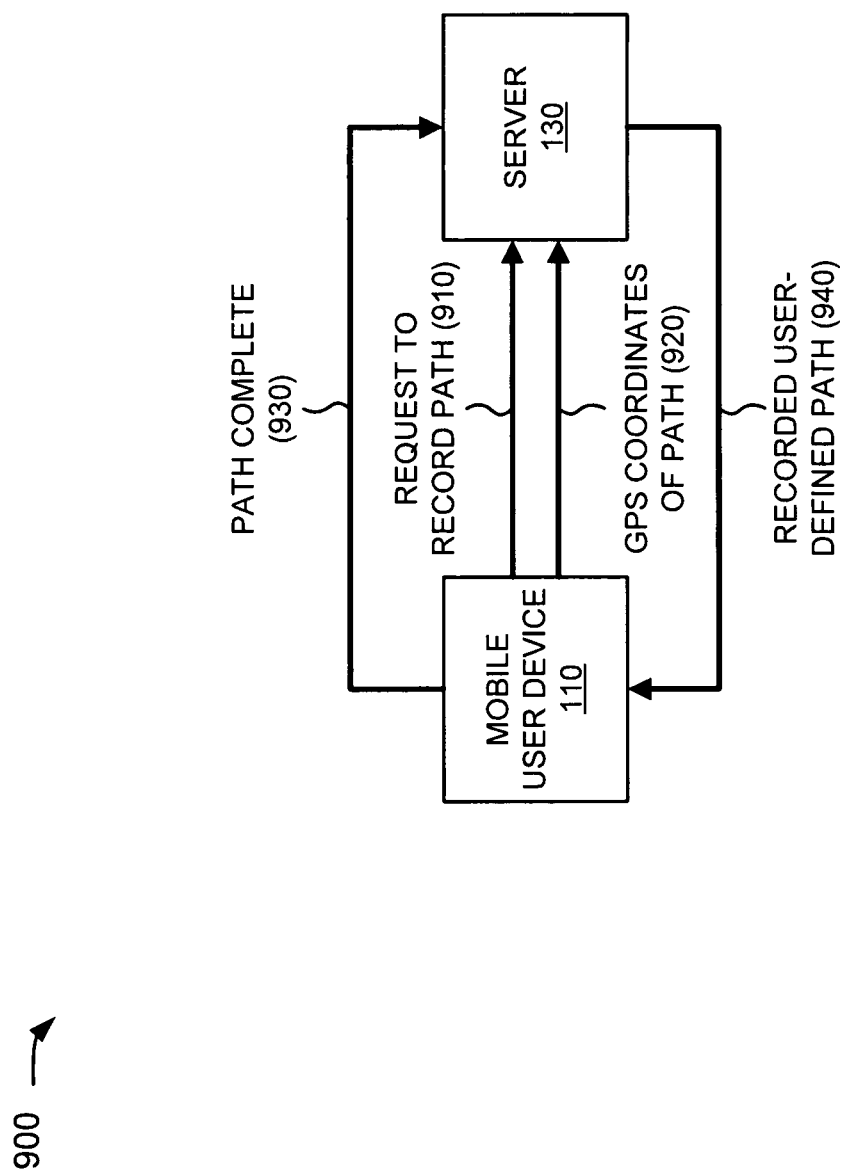

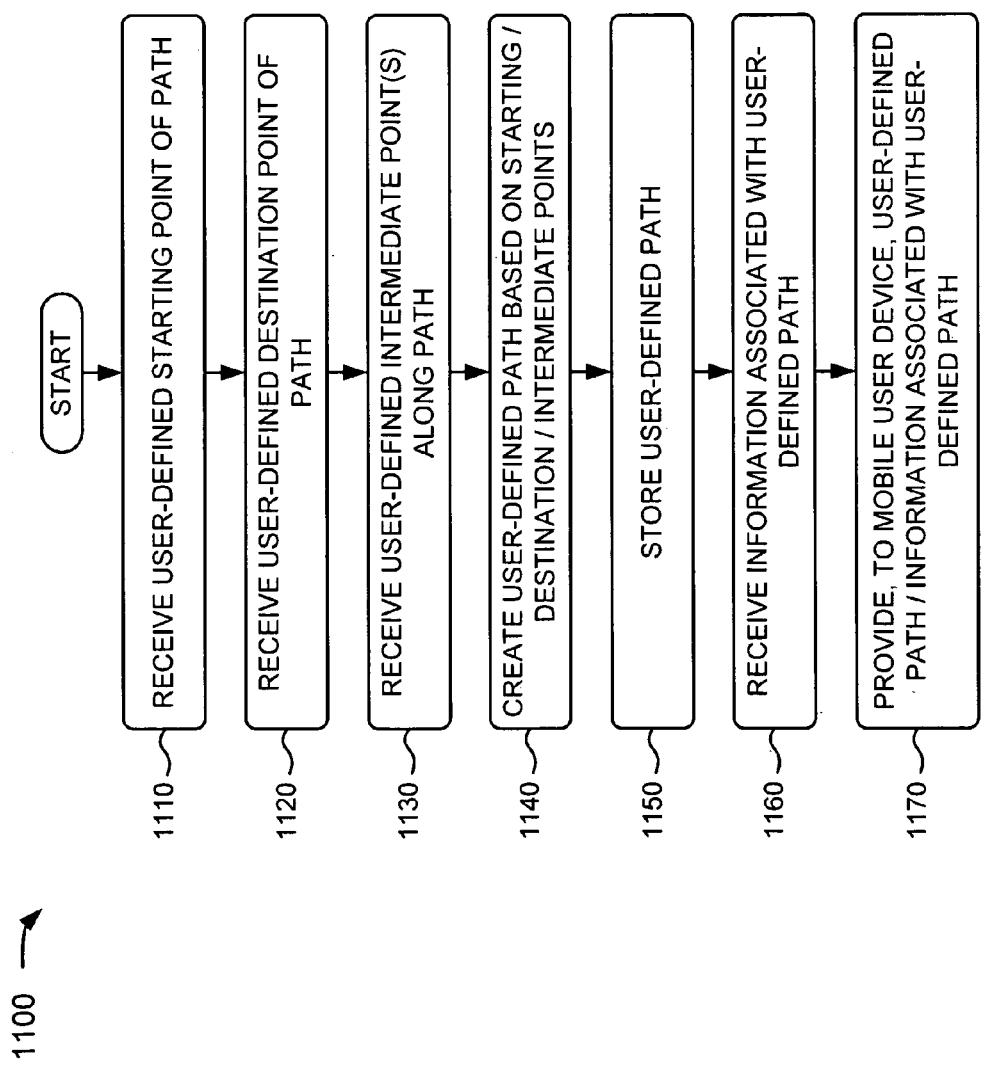

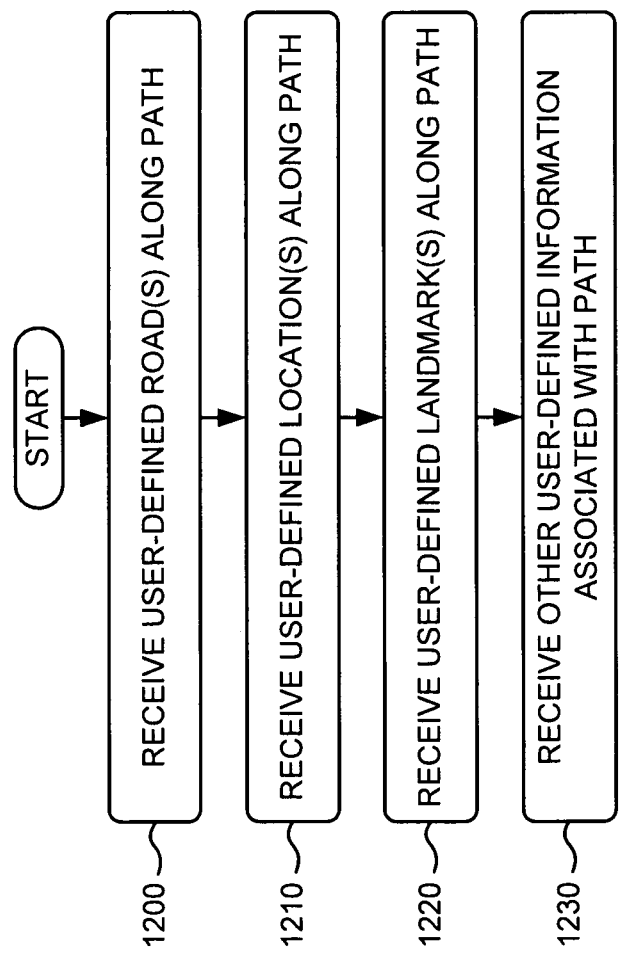

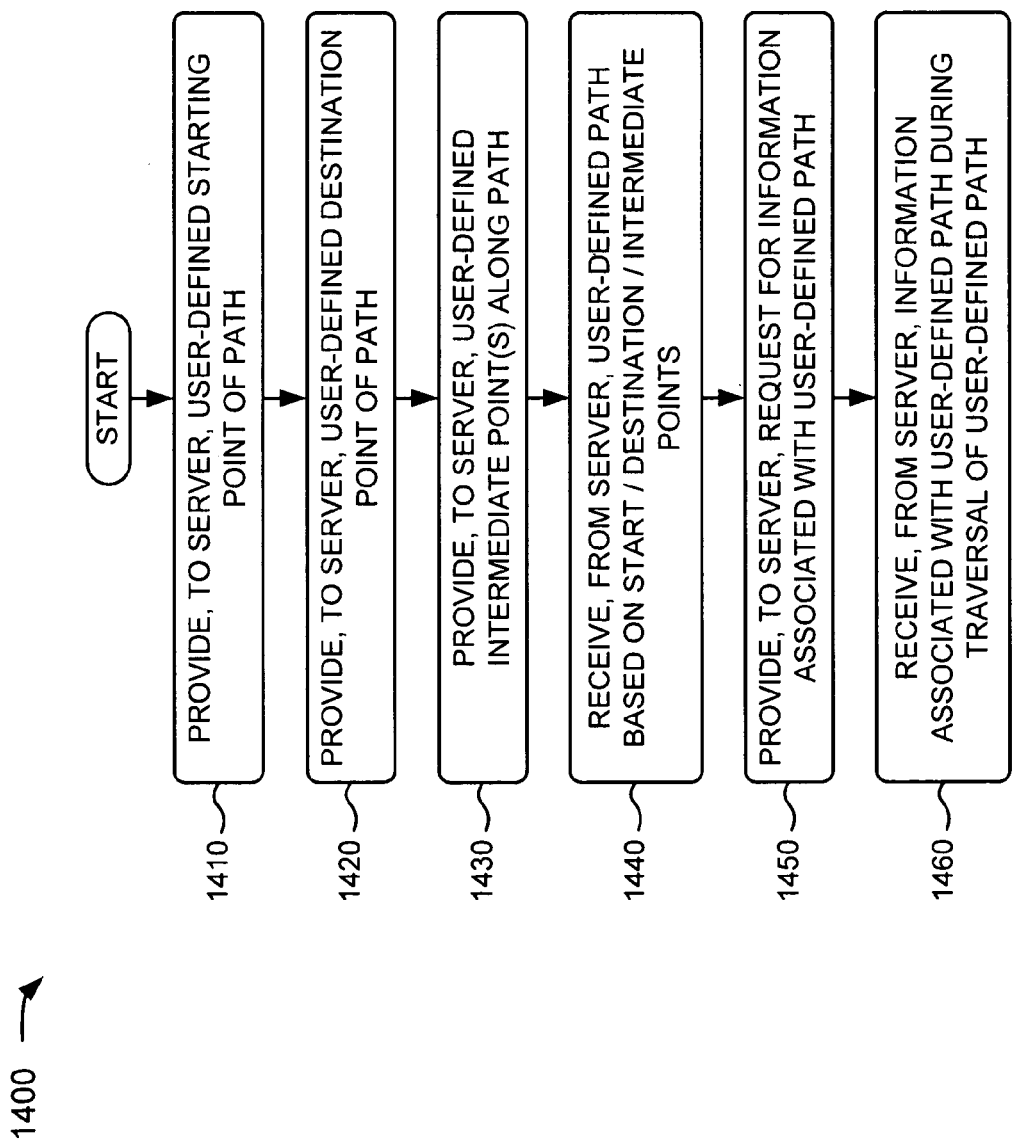

NAVIGATION BASED ON USER-DEFINED POINTS AND PATHS

BACKGROUND

A mobile communication device (e.g., a cell phone, a personal digital assistant (PDA), a global positioning system (GPS) navigation device, etc) may display a map showing the location of a user of the mobile communication device in order to aid the user with navigation (e.g., when walking or driving around an unknown location). Many navigation applications enable the mobile communication device user to input information, such as a starting point, a destination point, how a path between the starting and destination points should be calculated (e.g., shortest distance, shortest time, most use of highways, etc.), etc. The navigation applications utilize this information to calculate a path for the mobile communication device user.

However, such navigation applications do not enable the user to customize the calculated path. For example, such navigation applications do not permit the user to input intermediate points (e.g., locations to travel past between the starting and destination points) and/or additional path information (e.g., utilize certain streets, highways, etc. between the starting and destination points). Furthermore, if the user intentionally attempts to stray from the calculated path, the navigation applications recalculate the path and provide further instructions on how to return to the calculated path.

BRIEF DESCRIPTION OF THE DRAWINGS

FIG. 3 depicts a diagram of an exemplary mobile user device of the network illustrated in FIG. 1;

FIG. 4 illustrates a diagram of exemplary components of the mobile user device depicted in FIG. 3;

FIG. 5 depicts a diagram of exemplary operations capable of being performed by an exemplary portion of the network illustrated in FIG. 1;

FIG. 7 depicts a diagram of exemplary functional components of the server illustrated in FIG. 1;

FIGS. 8A-8C illustrate diagrams of further exemplary user interfaces capable of being generated by the mobile user device, the stationary user device, and/or the server depicted in FIG. 1;

FIG. 9 depicts a diagram of exemplary operations capable of being performed by an exemplary portion of the network illustrated in FIG. 1;

FIGS. 11-14 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user to customize a calculated path provided by a navigation application associated with a mobile user device (e.g., a cell phone, a PDA, a GPS navigation device, etc.). The user, via the mobile user device, may customize the calculated path by inputting intermediate points (e.g., locations to travel past that may be between a starting point and a destination point) and/or additional path information (e.g., utilize certain streets, highways, etc. between the starting and destination points). In one implementation, for example, the systems and/or methods may receive a user-defined starting point of a path, may receive a user-defined destination point of the path, and may receive one or more user-defined intermediate points along the path. The systems and/or methods may create a user-defined path based on the starting point, the destination point, and the intermediate point(s), and may store the user-defined path. The systems and/or methods may receive information associated with the user-defined path, and may provide, to a mobile user device, the information associated with the user-defined path.

As used herein, the term "user" is intended to be broadly interpreted to include a user device or a user of a user device. A "path," as the term is used herein, is to be broadly interpreted to include a course between two points, a route between two points, etc. Furthermore, the term "user device," as used herein, is intended to be broadly interpreted to include a mobile user device or a stationary user device.

Figure 1:
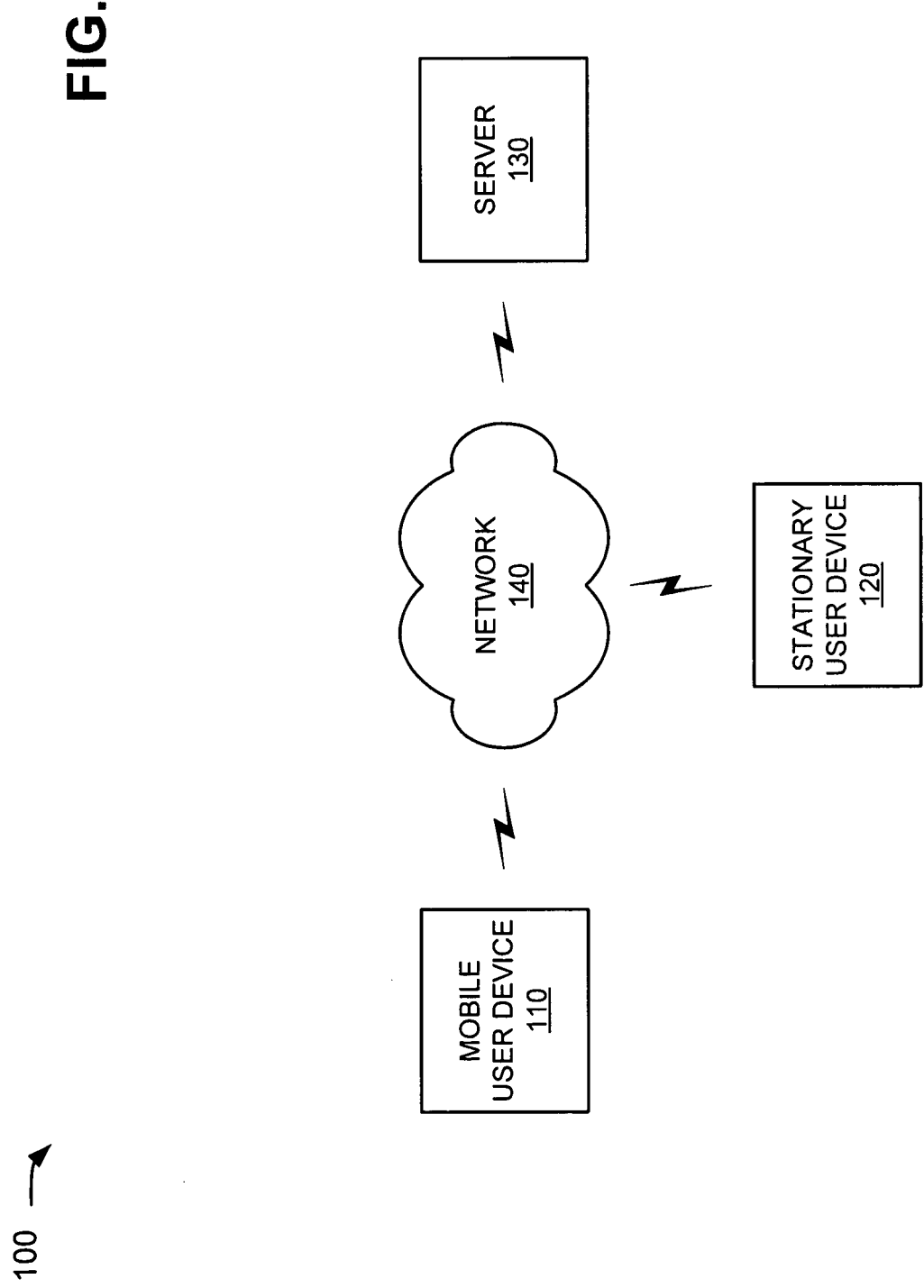
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a mobile user device 110, a stationary user device 120, and a server 130 interconnected by a network 140. Components of network 100 may interconnect via wired and/or wireless connections. A single mobile user device 110, stationary user device 120, server 130, and network 140 have been illustrated in FIG. 1 for simplicity. In practice, there may be more mobile user devices 110, stationary user devices 120, servers 130, and/or networks 140. Also, in some instances, one or more of the components of network 100 may perform one or more functions described as being performed by another one or more of the components of network 100.

Mobile user device 110 may include any device (e.g., a mobile communication device) that is capable of accessing server 130 via network 140. For example, mobile user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a GPS navigation device, an in-vehicle GPS navigation system, or other types of computation or communication devices, threads or processes running on these devices, and/or objects executable by these devices. In one implementation, mobile user device 110 may enable a user to customize a calculated path provided by a navigation application associated with mobile user device 110. The user, via mobile user device 110, may customize the calculated path by inputting intermediate points (e.g., locations to travel past that may be between a starting point and a destination point) and/or additional path information (e.g., utilize certain streets, highways, etc. between the starting and destination points).

Stationary user device 120 may include any device that is capable of accessing server 130 via network 140. For example, stationary user device 120 may include a laptop computer, a personal computer, a set-top box (STB), a television, or other types of computation or communication devices, threads or processes running on these devices, and/or objects executable by these devices. In one implementation, stationary user device 120 may enable a user to customize a calculated path provided by a navigation application associated with mobile user device 11O. The user, via stationary user device 120, may customize the calculated path by inputting intermediate points (e.g., locations to travel past that may be between a starting point and a destination point) and/or additional path information (e.g., utilize certain streets, highways, etc. between the starting and destination points).

Server 130 may include one or more server entities, or other types of computation or communication devices, that gather, process, search, and/or provide information in a manner described herein. In one implementation, server 130 may receive (e.g., from mobile user device 110 and/or stationary user device 120) a user-defined start point, a user-defined destination point, and one or more user-defined intermediate points associated with a path (e.g., to be navigated by a user associated with mobile user device 110). Server 130 may create a user-defined path based on the user-defined start point, the user-defined destination point, and the user-defined intermediate point(s), and may store (e.g., in a database associated with server 130) the user-defined path. Server 130 may receive information associated with the user-defined path (e.g., mileage, directional information, traffic information, etc.), and may provide the information associated with the user-defined path to mobile user device 110 (e.g., when mobile user device 110 is traversing the user-defined path).

Network 140 may include a local area network (LAN), a wide area network (WAN), a metropolitan area network (MAN), a telephone network, such as the Public Switched Telephone Network (PSTN) or Public Land Mobile Network (PLMN), an intranet, the Internet, or a combination of networks.

Figure 2:
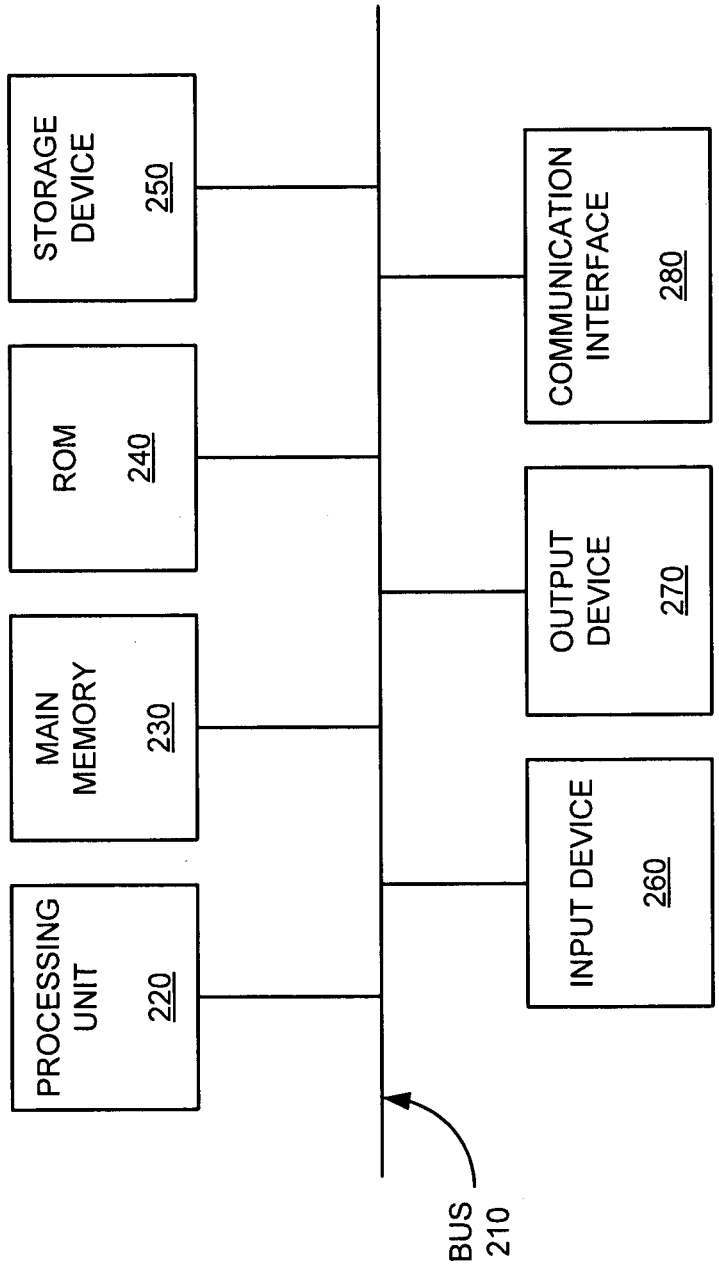
FIG. 2 illustrates a diagram of exemplary components of a stationary user device and/or a server of the network depicted in FIG. 1.

FIG. 2 illustrates a diagram of exemplary components of a device 200 that may correspond to stationary user device 120 and/or server 130. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

FIG. 3 depicts a diagram of an exemplary mobile user device 110. As illustrated, mobile user device 110 may include a housing 300, a speaker 310, a display 320, control buttons 330, a keypad 340, and/or a microphone 350. Housing 300 may protect the components of mobile user device 110 from outside elements. Speaker 310 may provide audible information to a user of mobile user device 110.

Display 320 may provide visual information to the user. For example, display 320 may display text input into mobile user device 110, text, images, video, and/or graphics received from another device, and/or information regarding incoming or outgoing calls or text messages, emails, media, games, phone books, address books, the current time, navigation directions, etc. Control buttons 330 may permit the user to interact with mobile user device 110 to cause mobile user device 110 to perform one or more operations. For example, control buttons 330 may be used to cause mobile user device 110 to transmit information. Keypad 340 may include a standard telephone keypad. Microphone 350 may receive audible information from the user.

Although FIG. 3 shows exemplary components of mobile user device 110, in other implementations, mobile user device 110 may contain fewer, different, differently arranged, or additional components than depicted in FIG. 3. In still other implementations, one or more components of mobile user device 110 may perform one or more other tasks described as being performed by one or more other components of mobile user device 110.

FIG. 4 illustrates a diagram of exemplary components of mobile user device 110. As shown, mobile user device 110 may include a processing unit 400, memory 410, a user interface 420, a communication interface 430, and/or an antenna assembly 440.

Processing unit 400 may include one or more processors, microprocessors, application specific integrated circuits (ASICs), field programmable gate arrays (FPGAs), or the like. Processing unit 400 may control operation of mobile user device 110 and its components. In one implementation, processing unit 400 may control operation of components of mobile user device 110 in a manner described herein.

Memory 410 may include a random access memory (RAM), a read-only memory (ROM), and/or another type of memory to store data and instructions that may be used by processing unit 400.

User interface 420 may include mechanisms for inputting information to mobile user device 110 and/or for outputting information from mobile user device 110. Examples of input and output mechanisms might include buttons (e.g., control buttons 330, keys of keypad 340, a joystick, etc.) or a touch screen interface to permit data and control commands to be input into mobile user device 110; a speaker (e.g., speaker 310) to receive electrical signals and output audio signals; a microphone (e.g., microphone 350) to receive audio signals and output electrical signals; a display (e.g., display 320) to output visual information (e.g., text input into mobile user device 110); and/or a vibrator to cause mobile user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 140).

As will be described in detail below, mobile user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of mobile user device 110, in other implementations, mobile user device 110 may contain fewer, different, differently arranged, or additional components than depicted in FIG. 4. In still other implementations, one or more components of mobile user device 110 may perform one or more other tasks described as being performed by one or more other components of mobile user device 110.

FIG. 5 depicts a diagram of exemplary operations capable of being performed by an exemplary portion 500 of network 100. As illustrated, exemplary network portion 500 may include mobile user device 110, stationary user device 120, and server 130. Mobile user device 110, stationary user device 120, and server 130 may include the features described above in connection with, for example, FIG. 1.

A user associated with mobile user device 110 may access a GPS navigation application (e.g., software that provides navigation with route calculation and directions to the user of the route to take, based on a vector-based map; software that provides navigation tracking and shows where you have been; Nav N Go; TomTom Navigator; TomTom Mobile; DeLorme Street Atlas; ALK CoPilot Live Laptop; Destinator; Garmin nRoute; Microsoft Streets and Trips; Google Earth; Google Maps; VZ Navigator; etc.) associated with mobile user device 110. The user (e.g., via mobile user device 110 and the GPS navigation application) may create user-defined path points 510, and may provide user-defined path points 510 to server 130. User-defined path points 510 may include a user-defined starting point (e.g., Philadelphia, Pa.), a user-defined destination point (e.g., New York City, N.Y.), and one or more user-defined intermediate points (e.g., waypoints, roads, locations, landmarks, points of interest, etc.) (e.g., Newark, N.J.) provided between the user-defined starting and destination points.

Server 130 may receive user-defined path points 510 (e.g., the user-defined starting, destination, and intermediate points), and may create a user-defined path 520 based on the user-defined starting point, destination point, and intermediate point(s). User-defined path 520 may include a path defined by the user-defined starting point, destination point, and intermediate point(s) (e.g., a path that starts at Philadelphia, Pa., travels through Newark, N.J., and ends at New York City, N.Y.). Server 130 may store user-defined path 520 (e.g., in a database (not shown) associated with server 130), and may retrieve information 530 associated with user-defined path 520. Information 530 may include mileage information (e.g., mileage associated with each route (e.g., road, highway, etc.) traversed on user-defined path 520), directional information (e.g., maps, road names, highway names, exit information, turn information, etc.), traffic information (e.g., traffic conditions associated with routes traversed on user-defined path 520), construction information (e.g., road construction, detour information, road closings, etc.), etc. Server 130 may retrieve information 530 from a variety of sources (e.g., from services provided by the GPS navigation application, from state and federal agencies (e.g., the department of motor vehicles), etc.).

In one exemplary implementation, server 130 may provide user-defined path 520 and/or information 530 to mobile user device 110 prior to the user beginning to traverse user-defined path 520 (e.g., with mobile user device 110). The user (e.g., via mobile user device 110) may review, edit, refine, update, etc. user-defined path 520 prior to traversing user-defined path 520. In other implementations, server 130 may provide (e.g., when requested by mobile user device 110) user-defined path 520 and/or information 530 to mobile user device 110 as the user is traversing user-defined path 520 (e.g., with mobile user device 110). In such a scenario, mobile user device 110 may provide GPS coordinates 540 associated with mobile user device 110 (e.g., a location of mobile user device 110) to server 130, and server 130 may provide one or more portions of user-defined path 520 and/or information 530 that correspond to GPS coordinates 540. For example, if the user is traversing a certain street associated with user-defined path 520, server 130 may provide, to mobile user device 110, portions of user-defined path 520 and/or information 530 that correspond to the certain street.

As further shown in FIG. 5, a user-defined path may, alternatively, be defined by a device other than mobile user device 110 (e.g., by stationary user device 120) and may be provided to mobile user device 110. For example, the user associated with mobile user device 110 may access the GPS navigation application associated with mobile user device 110 and/or stationary user device 120. The user (e.g., via stationary user device 120 and the GPS navigation application) may create user-defined path points 550, and may provide user-defined path points 550 to server 130. User-defined path points 550 may include a user-defined starting point (e.g., Philadelphia, Pa.), a user-defined destination point (e.g., Washington, D.C.), and one or more user-defined intermediate points (or waypoints) (e.g., Wilmington, Del.) provided between the user-defined starting and destination points.

Server 130 may receive user-defined path points 550 (e.g., the user-defined starting, destination, and intermediate points), and may create a user-defined path 560 based on the user-defined starting point, destination point, and intermediate point(s). User-defined path 560 may include a path defined by the user-defined starting point, destination point, and intermediate point(s) (e.g., a path that starts at Philadelphia, Pa., travels through Wilmington, Del., and ends at Washington, D.C.). Server 130 may store user-defined path 560 (e.g., in a database (not shown) associated with server 130), and may retrieve information 570 associated with user-defined path 560. Information 570 may include mileage information (e.g., mileage associated with each route (e.g., road, highway, etc.) traversed on user-defined path 560), directional information (e.g., maps, road names, highway names, exit information, turn information, etc.), traffic information (e.g., traffic conditions associated with routes traversed on user-defined path 560), construction information (e.g., road construction, detour information, road closings, etc.), etc. Server 130 may retrieve information 570 from a variety of sources (e.g., from services provided by the GPS navigation application, from state and federal agencies (e.g., the department of motor vehicles), etc.).

In one exemplary implementation, server 130 may provide user-defined path 560 and/or information 570 to mobile user device 110 and/or stationary user device 120 prior to the user beginning to traverse user-defined path 560 (e.g., with mobile user device 110). The user (e.g., via mobile user device 110 and/or stationary user device 120) may review, edit, refine, update, etc. user-defined path 560 prior to traversing user-defined path 560. In other implementations, server 130 may provide (e.g., when requested by mobile user device 110) user-defined path 560 and/or information 570 to mobile user device 110 as the user is traversing user-defined path 560 (e.g., with mobile user device 110). In such a situation, mobile user device 110 may provide GPS coordinates 540 (e.g., associated with mobile user device 110) to server 130, and server 130 may provide one or more portions of user-defined path 560 and/or information 570 that correspond to GPS coordinates 540. For example, if the user is traversing a certain highway associated with user-defined path 560, server 130 may provide, to mobile user device 110, portions of user-defined path 560 and/or information 560 that correspond to the certain highway.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

FIGS. 6A-6D illustrate diagrams of exemplary user interfaces 600 capable of being generated by mobile user device 110, stationary user device 120, and/or server 130. The user interfaces depicted in FIGS. 6A-6D, and the user interfaces depicted and described below in connection with FIGS. 8A-8C and 10A-10C (collectively referred to as "the user interfaces"), may include graphical user interfaces (GUIs) or non-graphical user interfaces, such as text-based interfaces.

The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., display 320).

Figure 6A:
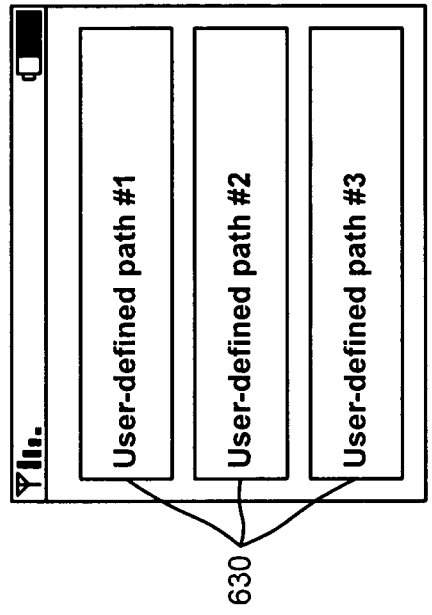
FIGS. 6A-6D illustrate diagrams of exemplary user interfaces capable of being generated by the mobile user device, the stationary user device, and/or the server depicted in FIG. 1.
Figure 6B:
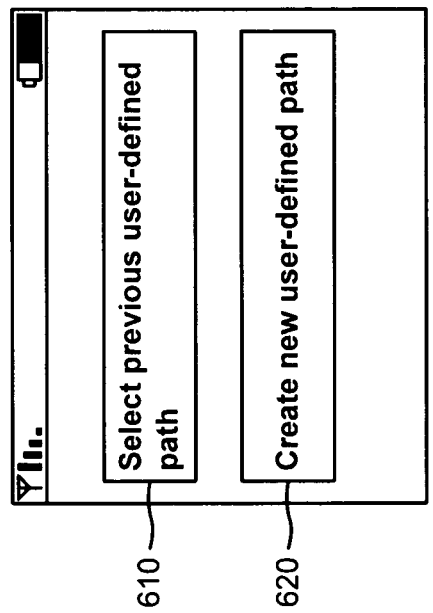

If a user (e.g., associated with mobile user device 110 and/or stationary user device 120) accesses the GPS navigation application, the user may be presented with the user interface depicted in FIG. 6A. As shown, the user may be presented with an option 610 to select a previous user-defined path and an option 620 to create a new user-defined path. If the user selects (e.g., via a selection mechanism, such as control buttons 330) option 610, the user may be presented with the user interface depicted in FIG. 6B. As shown in FIG. 6B, the user may be presented with one or more user-defined paths 630 (e.g., "User-defined path #1," "User-defined path #2," and "User-defined path #3") for selection. In one exemplary implementation, if the user selects one of user-defined paths 630, server 130 may provide the selected one of user-defined paths 630 (and associated information) to mobile user device 110. In another exemplary implementation, if the user selects one of user-defined paths 630, mobile user device 110 may retrieve (e.g., from memory 410) the selected one of user-defined paths 630 (and associated information). Mobile user device 110 may utilize the selected one of user-defined paths 630 to navigate the selected one of user-defined paths 630.

Figure 6D:
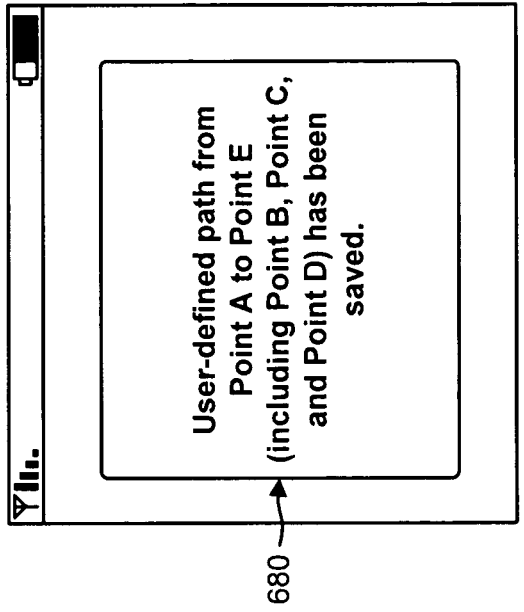
Figure 6C:
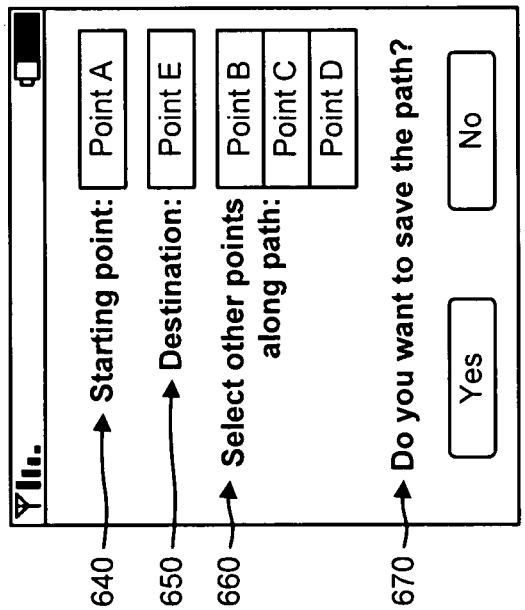

If the user selects (e.g., via a selection mechanism, such as control buttons 330) option 620, the user may be presented with the user interface depicted in FIG. 6C. As shown in FIG. 6C, the user may be presented a variety of input mechanisms (e.g., fields, menus, etc.) for creating a new user-defined path. For example, the user may be presented with a starting point input mechanism 640, a destination input mechanism 650, an intermediate point(s) input mechanism 660, and an option 670 to save the new user-defined path. Starting point input mechanism 640 may enable the user to input a starting point (e.g., "Point A") associated with the new user-defined path. Destination input mechanism 650 may enable the user to input a destination point (e.g. "Point E") associated with the new user-defined path. Intermediate point(s) input mechanism 660 may enable the user to input one or more other points (e.g., "Point B." "Point C," and "Point D") along the new user-defined path. Once the user has input the information for the new user-defined path, option 670 may enable the user (e.g., via selection of a "Yes" button) to save the new user-defined path.

If the user saves the new user-defined path, the user interface depicted in FIG. 6D may be provided to the user. As shown in FIG. 6D, the user interface may provide an indication 680 that the new user-defined path has been saved (e.g., "User-defined path from Point A to Point E (including Point B, Point C, and Point D) has been saved."). In one exemplary implementation, server 130 may store the new user-defined path (e.g., in a database associated with server 130). In other implementations, mobile user device 120 and/or stationary user device 130 may store the new user-defined path (e.g., in main memory 230, ROM 240, storage device 250, and/or memory 410).

Although user interfaces 600 depict a variety of information, in other implementations, user interfaces 600 may depict less, additional, different, or differently arranged information than depicted in FIGS. 6A-6D.

FIG. 7 depicts a diagram of exemplary functional components of server 130. In one implementation, the functions described in connection with FIG. 7 may be performed by processing unit 220 (FIG. 2). As shown in FIG. 7, server 130 may include a path points receiver 700, a path database 710, a path/information generator 720, and a path aggregator 730.

Path points receiver 700 may include any hardware or combination of hardware and software that may receive user-defined path points 510 and/or GPS coordinates 540 from mobile user device 110, and/or may receive user-defined path points 550 from stationary user device 120. Path points receiver 700 may provide user-defined path points 510 and/or user-defined path points 550 to database 710 and/or to path/information generator 720.

Path database 710 may include a storage device (e.g., main memory 230, ROM 240, storage device 250, etc.) that may store information received by server 130. In one implementation, path database 710 may store user-defined path points 510 and/or GPS coordinates 540 received from mobile user device 110. In other implementations, path database 710 may store user-defined path points 550 received from stationary user device 120. In still other implementation, path database 710 may store user-defined path 520, information 530 associated with user-defined path 520, user-defined path 560, and/or information 570 associated with user-defined path 560 (e.g., received from path/information generator 720).

Path/information generator 720 may include any hardware or combination of hardware and software that may receive user-defined path points 510 and/or user-defined path points 550 from path points receiver 700, may create user-defined path 520 based on user-defined path points 510, and may create user-defined path 560 based on user-defined path points 550. Path/information generator 720 may also receive path information 740 from a variety of sources (e.g., from services provided by the GPS navigation application, from state and federal agencies, etc.). Path information 740 may include may include mileage information, directional information (e.g., maps, road names, highway names, exit information, turn information, etc.), traffic information, construction information (e.g., road construction, detour information, road closings, etc.), etc. Path/information generator 720 may associate corresponding path information 740 with user-defined path 520 and/or user-defined path 560 to create information 530 associated with user-defined path 520 and information 570 associated with user-defined path 560. As further shown in FIG. 7, path/information generator 720 may provide user-defined path 520, information 530, user-defined path 560, and/or information 570 to path database 710 and/or path aggregator 730. Path/information generator 720 may provide user-defined path 520 and information 530 to mobile user device 110, and may provide user-defined path 560 and information 570 to mobile user device 110 and/or stationary user device 120.

Path aggregator 730 may include any hardware or combination of hardware and software that may receive user-defined path 520, information 530, user-defined path 560, and/or information 570 from path/information generator 720, and may receive other user-defined paths 750 (e.g., from other user devices). Other user-defined paths 750 may include one or more paths defined by other users associated with server 130. Path aggregator 730 may aggregate the received information, and may generate recommendations 760 based on the aggregated information. Recommendations 760 may include points along a particular path where other users traveled by, stopped at, recommend, etc. For example, if other users stopped at (or traveled past) Trenton, N.J. on their way from Philadelphia, Pa. to New York City, N.Y., server 130 may recommend (e.g., via recommendations 760), to a user who created a user-defined path between Philadelphia and New York City, that the user stop at (or travel past) Trenton since other users have traveled by, stopped at, recommend, etc. Trenton.

Although FIG. 7 shows exemplary functional components of server 130, in other implementations, server 130 may contain fewer, different, differently arranged, or additional functional components than depicted in FIG. 7. In still other implementations, one or more functional components of server 130 may perform one or more other tasks described as being performed by one or more other functional components of server 130.

FIGS. 8A-8C illustrate diagrams of further exemplary user interfaces 800 capable of being generated by mobile user device 110, stationary user device 120, and/or server 130. If a user (e.g., associated with mobile user device 110 and/or stationary user device 120) accesses the GPS navigation application, the user may be presented with the user interface depicted in FIG. 8A. As shown, the user may be presented with an option 810 to select a previous user-defined path and an option 820 to create a new user-defined path. If the user selects (e.g., via a selection mechanism, such as control buttons 330) option 810, the user may be presented with the user interface depicted and described above in connection with FIG. 6B.

If the user selects (e.g., via a selection mechanism, such as control buttons 330) option 820, the user may be presented with the user interface depicted in FIG. 8B. As shown in FIG. 8B, the user may be presented a variety of input mechanisms (e.g., fields, menus, etc.) for creating a new user-defined path. For example, the user may be presented with a starting point input mechanism 830, a destination input mechanism 840, an intermediate point(s) input mechanism 850, one or more recommended intermediate points 860, and an option 870 to save the new user-defined path. Starting point input mechanism 830 may enable the user to input a starting point (e.g., "Point A") associated with the new user-defined path. Destination input mechanism 840 may enable the user to input a destination point (e.g. "Point E") associated with the new user-defined path. Intermediate point(s) input mechanism 850 may enable the user to input one or more other points (e.g., "Point B," "Point C," and "Point D") along the new user-defined path. Recommended intermediate point(s) 860 may enable the user to select intermediate point(s) (e.g., "Point B1" and "Point C1") recommended by other users (e.g., as provided by recommendations 760 (FIG. 7)) along the new user-defined path. Once the user has input the information for the new user-defined path, option 870 may enable the user (e.g., via selection of a "Yes" button) to save the new user-defined path.

If the user saves the new user-defined path, the user interface depicted in FIG. 8C may be provided to the user. As shown in FIG. 8C, the user interface may provide an indication 880 that the new user-defined path has been saved (e.g., "User-defined path from Point A to Point E (including Point B, Point B1, Point C, Point C1, and Point D) has been saved."). In one exemplary implementation, server 130 may store the new user-defined path (e.g., in a database associated with server 130). In other implementations, mobile user device 120 and/or stationary user device 130 may store the new user-defined path (e.g., in main memory 230, ROM 240, storage device 250, and/or memory 410).

Although user interfaces 800 depict a variety of information, in other implementations, user interfaces 800 may depict less, additional, different, or differently arranged information than depicted in FIGS. 8A-8C.

FIG. 9 depicts a diagram of exemplary operations capable of being performed by an exemplary portion 900 of network 100. As illustrated, exemplary network portion 900 may include mobile user device 110 and server 130. Mobile user device 110 and server 130 may include the features described above in connection with, for example, FIG. 1.

A user associated with mobile user device 110 may access a GPS navigation application associated with mobile user device 110, may generate (e.g., via mobile user device 110 and the GPS navigation application) a request 910 to record a path, and may provide request 910 to server 130. Request 910 may include a request to record a path to be traveled by the user (and mobile user device 110). For example, the user may want to record a daily route he/she takes to work so that server 130 may provide information (e.g., information 530 and/or information 570) associated with the daily route as the user travels to work.

As further shown in FIG. 9, mobile user device 110 may provide GPS coordinates 920 associated with mobile user device 110 as the user traverses the path (e.g., the daily route to work). Server 130 may receive request 910 and GPS coordinates 920 from mobile user device 110, and may record GPS coordinates 920 based on request 910. When the user completes the path, mobile user device 110 may generate an indication 930 that the path is complete, and may provide indication 930 to server 130. Server 130 may receive indication 930, may stop recording GPS coordinates 920, and may generate a recorded user-defined path 940 based on the recorded GPS coordinates 920. Server 130 may store recorded user-defined path 940 and/or may provide recorded user-defined path 940 to mobile user device 110. Mobile user device 110 may receive recorded user-defined path 940, and may store recorded user-defined path 940. In the future, mobile user device 110 may access recorded user-defined path 940 (e.g., when the user is traveling to work), and may receive (e.g., from server 130) information associated with recorded user-defined path 940 (e.g., information associated with the daily route as the user travels to work).

Although FIG. 9 shows exemplary components of network portion 900, in other implementations, network portion 900 may contain fewer, different, differently arranged, or additional components than depicted in FIG. 9. In still other implementations, one or more components of network portion 900 may perform one or more other tasks described as being performed by one or more other components of network portion 900. For example, in one implementation, server 130 may be omitted and mobile user device 110 may perform the tasks described above as being performed by server 130.

Figure 10C:
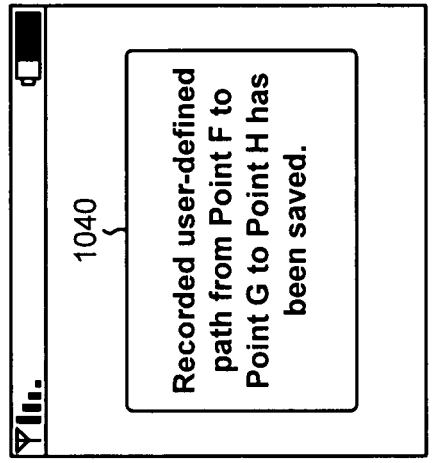
FIGS. 10A-10C illustrate diagrams of additional exemplary user interfaces capable of being generated by the mobile user device, the stationary user device, and/or the server depicted in FIG. 1.
Figure 10B:
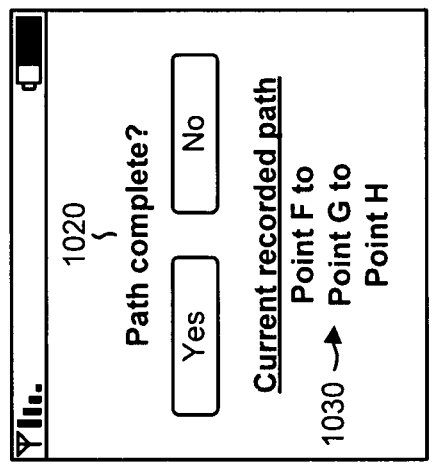
Figure 10A:
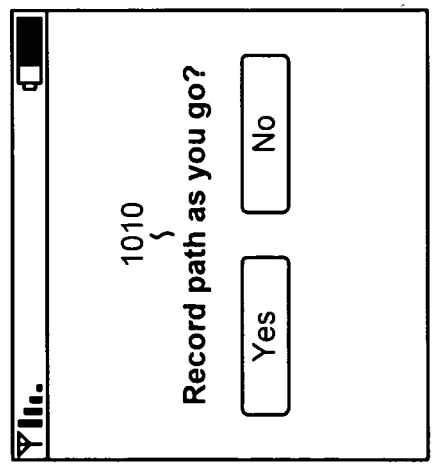

FIGS. 10A-10C illustrate diagrams of additional exemplary user interfaces 1000 capable of being generated by mobile user device 110, stationary user device 120, and/or server 130. If a user (e.g., associated with mobile user device 110) accesses the GPS navigation application, the user may be presented with the user interface depicted in FIG. 10A. As shown, the user may be presented with an option 1010 to record a path (e.g., "Record path as you go?"). If the user selects (e.g., via selection of a "Yes" button) to record a path, mobile user device 110 may generate a request (e.g., request 910) to record a path, and may provide the request to server 130. Server 130 may receive the request and GPS coordinates (e.g., GPS coordinates 920) from mobile user device 110, and may record the GPS coordinates until the path is complete.

While traversing the recorded path, the user may be presented with the user interface depicted in FIG. 10B. As shown, the user may be asked a question 1020 regarding path completion (e.g., whether the recorded path is complete), and may be presented with information 1030 regarding the current recorded path (e.g., "Point F to Point G to Point H"). If the recorded path is complete, the user may answer question 1020 in the affirmative (e.g., via selection of a "Yes" button), and mobile user device 110 may generate an indication (e.g., indication 930) that the path is complete, and may provide the indication to server 130. Server 130 may receive the indication, may stop recording the GPS coordinates, and may generate a recorded user-defined path based on the recorded GPS coordinates. Server 130 may provide the recorded user-defined path to mobile user device 110, and the user may be presented with the user interface depicted in FIG. 10C. As shown, the user may be provided information 1040 regarding the recorded user-defined path (e.g., "Recorded user-defined path from Point F to Point G to Point H has been saved.").

Although user interfaces 1000 depict a variety of information, in other implementations, user interfaces 1000 may depict less, additional, different, or differently arranged information than depicted in FIGS. 10A-10C.

FIGS. 11-14 illustrate flow charts of an exemplary process 1100 for enabling a user to customize a calculated path provided by a navigation application according to implementations described herein. In one implementation, process 1100 may be performed by server 130. In another implementation, some or all of process 1100 may be performed by another device or group of devices, including or excluding server 130.

As illustrated in FIG. 11, process 1100 may begin with receipt of a user-defined starting point of a path (block 1110), receipt of a user-defined destination point of the path (block 1120), and receipt of one or more intermediate points along the path (block 1130). For example, in implementations described above in connection with FIG. 5, a user (e.g., via mobile user device 110 and the GPS navigation application) may create user-defined path points 510, and may provide user-defined path points 510 to server 130. User-defined path points 510 may include a user-defined starting point, a user-defined destination point, and one or more user-defined intermediate points provided between the user-defined starting and destination points. Server 130 may receive user-defined path points 510.

As further shown in FIG. 11, a user-defined path may be created based on the user-defined starting point, the user-defined destination point, and the user-defined intermediate point(s) (block 1140), and the user-defined path may be stored (block 1150). For example, in implementations described above in connection with FIGS. 5 and 7, server 130 may create user-defined path 520 based on the user-defined starting point, destination point, and intermediate point(s). User-defined path 520 may include a path defined by the user-defined starting point, destination point, and intermediate point(s). Server 130 may store user-defined path 520 (e.g., in path database 710 associated with server 130).

Returning to FIG. 11, information associated with the user-defined path may be received (block 1160), and the user-defined path and the information associated with the user-defined path may be provided to a mobile user device (block 1170). For example, in implementations described above in connection with FIG. 7, path/information generator 720 of server 130 may receive path information 740 from a variety of sources (e.g., from services provided by the GPS navigation application, from state and federal agencies, etc.). Path information 740 may include may include mileage information, directional information (e.g., maps, road names, highway names, exit information, turn information, etc.), traffic information, construction information (e.g., road construction, detour information, road closings, etc.), etc. Path/information generator 720 may associate corresponding path information 740 with user-defined path 520 and/or user-defined path 560 to create information 530 associated with user-defined path 520 and information 570 associated with user-defined path 560. Path/information generator 720 may provide user-defined path 520 and information 530 to mobile user device 110, and may provide user-defined path 560 and information 570 to mobile user device 110 and/or stationary user device 120.

Process block 1130 may include the process blocks depicted in FIG. 12. As shown in FIG. 12, process block 1130 may include receiving one or more user-defined roads along the path (block 1200), receiving one or more user-defined locations along the path (block 1210), receiving one or more user-defined landmarks along the path (block 1220), and/or receiving other user-defined information associated with the path (block 1230). For example, in implementations described above in connection with FIG. 5, the user (e.g., via mobile user device 110 and the GPS navigation application) may create user-defined path points 510. User-defined path points 510 may include one or more user-defined intermediate points (e.g., which may include one or more waypoints, roads, locations, landmarks, points of interest, etc.) provided between the user-defined starting and destination points.

Figure 13:
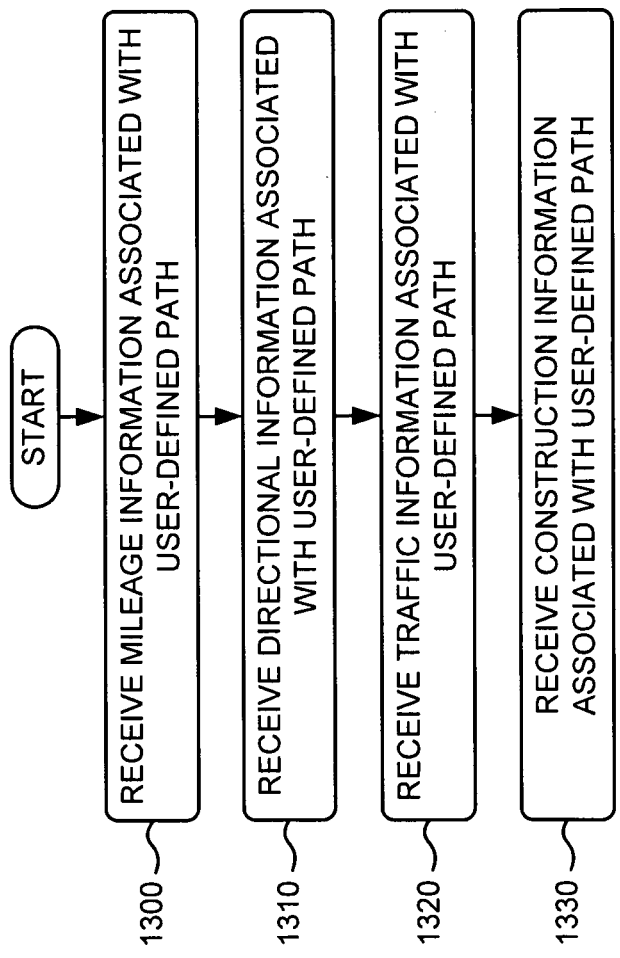

Process block 1160 may include the process blocks depicted in FIG. 13. As shown in FIG. 13, process block 1160 may include receiving mileage information associated with the user-defined path (block 1300), receiving directional information associated with the user-defined path (block 1310), receiving traffic information associated with the user-defined path (block 1320), and/or receiving construction information associated with the user-defined path (block 1330). For example, in implementations described above in connection with FIG. 7, path/information generator 720 of server 130 may receive path information 740 from a variety of sources (e.g., from services provided by the GPS navigation application, from state and federal agencies, etc.). Path information 740 may include may include mileage information, directional information (e.g., maps, road names, highway names, exit information, turn information, etc.), traffic information, construction information (e.g., road construction, detour information, road closings, etc.), etc.

FIG. 14 illustrates a flow chart of an exemplary process 1400 for enabling a user to customize a calculated path provided by a navigation application according to implementations described herein. In one implementation, process 1400 may be performed by mobile user device 110 and/or stationary user device 120. In another implementation, some or all of process 1400 may be performed by another device or group of devices, including or excluding mobile user device 110 and/or stationary user device 120.

As illustrated in FIG. 14, process 1400 may begin with providing, to a server, a user-defined starting point of a path (block 1410), providing, to the server, a user-defined destination point of the path (block 1420), and providing, to the server, one or more intermediate points along the path (block 1430). For example, in implementations described above in connection with FIG. 5, the user (e.g., via mobile user device 110 and the GPS navigation application) may create user-defined path points 510, and may provide user-defined path points 510 to server 130. User-defined path points 510 may include a user-defined starting point (e.g., Philadelphia, Pa.), a user-defined destination point (e.g., New York City, N.Y.), and one or more user-defined intermediate points (e.g., waypoints, roads, locations, landmarks, points of interest, etc.) (e.g., Newark, N.J.) provided between the user-defined starting and destination points.

As further shown in FIG. 14, a user-defined path, based on the user-defined starting point, the user-defined destination point, and the user-defined intermediate point(s), may be received from the server (block 1440), a request for information associated with the user-defined path may be provided to the server (block 1450), and the information associated with the user-defined path may be received from the server during traversal of the user-defined path (block 1460). For example, in implementations described above in connection with FIG. 5, server 130 may create user-defined path 520 based on the user-defined starting point, destination point, and intermediate point(s). Server 130 may provide (e.g., when requested by mobile user device 110) user-defined path 520 and/or information 530 associated with user-defined path 520 to mobile user device 110 as the user is traversing user-defined path 520 (e.g., with mobile user device 110). Mobile user device 110 may provide GPS coordinates 540 associated with mobile user device 110 (e.g., a location of mobile user device 110) to server 130, and server 130 may provide one or more portions of user-defined path 520 and/or information 530 that correspond to GPS coordinates 540.

Systems and/or methods described herein may enable a user to customize a calculated path provided by a navigation application associated with a mobile user device. The user, via the mobile user device, may customize the calculated path by inputting intermediate points (e.g., locations to travel past that may be between a starting point and a destination point) and/or additional path information (e.g., utilize certain streets, highways, etc. between the starting and destination points). In one implementation, for example, the systems and/or methods may receive a user-defined starting point of a path, may receive a user-defined destination point of the path, and may receive one or more user-defined intermediate points along the path. The systems and/or methods may create a user-defined path based on the starting point, the destination point, and the intermediate point(s), and may store the user-defined path. The systems and/or methods may receive information associated with the user-defined path, and may provide, to a mobile user device, the information associated with the user-defined path.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11-14, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server and from a user device, information identifying a user-defined starting point associated with a path to be navigated by a first user associated with the user device;
   receiving, by the server and from the user device, information identifying a user-defined destination point associated with path;
   identifying, by the server and based on information stored by the server, a second user that traveled from the user-defined starting point to the user-defined destination point;
   determining, by the server and based on identifying the second user, an intermediate point that the second user stopped at or traveled by while traveling from the user-defined starting point to the user-defined destination point;
   providing, by the server and to the user device, information identifying the intermediate point as a recommendation;
   receiving, by the server and from the user device, a selection of the intermediate point;
   creating, by the server, a user-defined path based on the user-defined starting point, the user-defined destination point, and the intermediate point; and
   providing, by the server, the user-defined path to the user device.

2. The method of claim 1, further comprising:
   receiving information associated with the user-defined path; and
   providing, to the user device, the information associated with the user-defined path.

3. The method of claim 2, where receiving information associated with the user-defined path comprises one or more of:
   receiving mileage information associated with the user-defined path,
   receiving directional information associated with the user-defined path,
   receiving traffic information associated with the user-defined path, or
   receiving construction information associated with the user-defined path.

4. The method of claim 2, further comprising:
   storing the user-defined path and the information associated with the user-defined path.

5. The method of claim 1, further comprising:
   determining one or more other intermediate points provided between the user-defined starting point and the user-defined destination point,
   the one or more other intermediate points being recommended by one or more other users; and
   providing, to the user device, information identifying the one or more other intermediate points.

6. The method of claim 5, further comprising:
   receiving, from the user device, a selection of at least one of the one or more other intermediate points,
   where creating the user-defined path comprises:
      creating the user-defined path based on the user-defined starting point, the user-defined destination point, the intermediate point, and the at least one of the one or more other intermediate points.

7. The method of claim 1, where providing the user-defined path comprises:
   providing the user-defined path to the user device when the user is navigating the user-defined path.

8. The method of claim 1, further comprising:
   receiving, from the user device, information identifying one or more user-defined intermediate points,
   where receiving, from the user device, the information identifying the one or more user-defined intermediate points comprises one or more of:
      receiving, from the user device, information regarding one or more user-identified roads provided between the user-defined starting point and the user-defined destination point,
      receiving, from the user device, information regarding one or more user-identified locations provided between the user-defined starting point and the user-defined destination point, or
      receiving, from the user device, information regarding one or more user-identified landmarks provided between the user-defined starting point and the user-defined destination point, and
   where creating the user-defined path comprises:
      creating the user-defined path based on the user-defined starting point, the user-defined destination point, the intermediate point, and the one or more user-defined intermediate points.

9. The method of claim 1, where the user device comprises one or more of:
   a radiotelephone,
   a personal communications system (PCS) terminal,
   a personal digital assistant (PDA),
   a laptop computer,
   a global positioning system (GPS) navigation device, or
   an in-vehicle GPS navigation system.

10. A server comprising:
    a processor configured to:
       receive information identifying a user-defined starting point associated with a path to be navigated by a first user associated with a user device,
       receive information identifying a user-defined destination point associated with the path,
       identify, based on information stored by the server, a second user that traveled from the user-defined starting point to the user-defined destination point,
       determine, based on identifying the second user, an intermediate point that the second user stopped at or traveled by while traveling from the user-defined starting point to the user-defined destination point,
       provide, to the user device, a recommendation that includes information identifying the intermediate point,
       receive a selection of the intermediate point,
       create a user-defined path based on the user-defined starting point, the user-defined destination point, and the intermediate point, and
       provide the user-defined path to the user device.

11. The server of claim 10, where the processor is further configured to:
    receive information associated with the user-defined path, and provide, to the user device, the information associated with the user-defined path.

12. The server of claim 11, where the information associated with the user-defined path comprises one or more of:
mileage information associated with the user-defined path,
directional information associated with the user-defined path,
traffic information associated with the user-defined path, or
construction information associated with the user-defined path.

13. The server of claim 11, where the processor is further configured to:
store the user-defined path and the information associated with the user-defined path.

14. The server of claim 11, where the user-defined path and the information associated with the user-defined path are provided to the user device when the user is navigating the user-defined path.

15. The server of claim 10, where the intermediate point comprises one or more of:
information regarding a road between the user-defined starting point and the user-defined destination point,
information regarding a location between the user-defined starting point and the user-defined destination point, or
information regarding a landmark between the user-defined starting point and the user-defined destination point.

16. The server of claim 10, where the processor is further configured to:
determine another intermediate point provided between the user-defined starting point and the user-defined destination point,
the other intermediate point being recommended by one or more other users,
provide another recommendation that includes information identifying the other intermediate point to the user device,
receive, from the user device, a selection of the recommended intermediate point,
create a new user-defined path based on the user-defined starting point, the user-defined destination point, the intermediate point, and the recommended intermediate point, and
provide the new user-defined path to the user device.

17. A non-transitory computer-readable medium storing instructions, the instructions comprising:
a plurality of instructions that, when executed by at least one processor of a server, cause the at least one processor to:
receive first information identifying a starting point associated with a path to be navigated by a first user associated with a user device;
receive second information identifying a destination point associated with the path;
identify a second user that traveled from the starting point to the destination point based on the first information identifying the starting point and the second information identifying the destination point;
determine, based on identifying the second user, an intermediate point that the second user stopped at or traveled by while traveling from the starting point to the destination point;
provide, to the user device, a recommendation that includes information identifying the intermediate point;
receive, from the user device, a selection of the intermediate point; and
determine a user-defined path based on the starting point, the destination point, and the intermediate point.

18. non-transitory computer-readable medium of claim 17, where the instructions further comprise:
one or more instructions that, when executed by the at least one processor, cause the at least one processor to:
determine one or more other intermediate points that are recommended by one or more other users; and
provide, to the user device, information identifying the one or more other intermediate points.

19. The non-transitory computer-readable medium of claim 18, where the one or more other intermediate points are provided between the user-defined starting point and the user-defined destination point.

20. The non-transitory computer-readable medium of claim 18, where the plurality of instructions to create the user-defined path comprise:
one or more instructions that, when executed by the at least one processor, cause the at least one processor to:
receive a selection of one or more of the one or more other intermediate points; and
determine the user-defined path based on the starting point, the destination point, the intermediate point, and the one or more of the one or more other intermediate points.

21. The non-transitory computer-readable medium of claim 17, where the instructions further comprise:
one or more instructions that, when executed by the at least one processor, cause the at least one processor to:
determine information associated with the user-defined path; and
provide, to the user device, the information associated with the user-defined path.

22. The non-transitory computer-readable medium of claim 21, where the information associated with the user-defined path comprises one or more of:
mileage information associated with the user-defined path, or
directional information associated with the user-defined path.

23. The non-transitory computer-readable medium of claim 17, where the intermediate point comprises information regarding a geographic location between the starting point and the destination point.

24. The non-transitory computer-readable medium of claim 17, where the information associated with user-defined path comprises one or more of:
traffic information associated with the user-defined path, or
construction information associated with the user-defined path.

25. The non-transitory computer-readable medium of claim 17, where the plurality of instructions to create the user-defined path comprise:
one or more instructions that, when executed by the at least one processor, cause the at least one processor to:
receive, from the user device, third information identifying one or more user-defined intermediate points, and
determine the user-defined path based on the starting point, the destination point, the intermediate point, and the one or more user-defined intermediate points.

* * * * *